(12) United States Patent
Acker et al.

(10) Patent No.: US 7,125,620 B2
(45) Date of Patent: Oct. 24, 2006

(54) FUEL CELL MEMBRANE AND FUEL CELL SYSTEM WITH INTEGRATED GAS SEPARATION

(75) Inventors: William P. Acker, Rexford, NY (US); Gerhard Beckmann, Altamont, NY (US)

(73) Assignee: MTI Microfuel Cells, Inc., Albany, NY (US)

( * ) Notice: Subject to any disclaimer, the term of this patent is extended or adjusted under 35 U.S.C. 154(b) by 228 days.

(21) Appl. No.: 09/997,693

(22) Filed: Nov. 30, 2001

(65) Prior Publication Data

US 2002/0102451 A1    Aug. 1, 2002

Related U.S. Application Data

(60) Provisional application No. 60/250,592, filed on Nov. 30, 2000.

(51) Int. Cl.
*H01M 8/04* (2006.01)
*H01M 8/10* (2006.01)
*C08J 5/22* (2006.01)

(52) U.S. Cl. .............................. 429/33; 429/42; 429/44; 521/27

(58) Field of Classification Search .................. 429/33, 429/42, 44, 46; 521/27
See application file for complete search history.

(56) References Cited

U.S. PATENT DOCUMENTS

| | | | |
|---|---|---|---|
| 4,248,682 A * | 2/1981 | Lindstrom et al. ........... | 204/242 |
| 4,420,544 A | 12/1983 | Lawson et al. ................ | 429/13 |
| 4,469,562 A * | 9/1984 | Chang ..................... | 205/782.5 |
| 4,612,261 A | 9/1986 | Tsukui et al. .................. | 429/13 |
| 4,828,941 A * | 5/1989 | Sterzel ........................ | 429/33 |
| 4,865,925 A | 9/1989 | Ludwig et al. ................ | 429/12 |
| 5,082,472 A | 1/1992 | Mallouk et al. ................ | 55/16 |
| 5,085,950 A * | 2/1992 | Primdahl ...................... | 429/30 |
| 5,176,966 A * | 1/1993 | Epp et al. ...................... | 429/26 |
| 5,525,436 A * | 6/1996 | Savinell et al. ................ | 429/30 |
| 5,547,551 A * | 8/1996 | Bahar et al. ................. | 204/296 |
| 5,573,866 A | 11/1996 | Van Dine et al. ............. | 429/13 |
| 5,599,638 A | 2/1997 | Surampudi et al. ........... | 429/33 |
| 5,656,389 A * | 8/1997 | Tetzlaff et al. ................ | 429/41 |
| 5,773,162 A | 6/1998 | Surampudi et al. ........... | 429/39 |
| 5,795,496 A | 8/1998 | Yen et al. ................... | 252/62.2 |
| 5,919,583 A * | 7/1999 | Grot et al. ..................... | 429/33 |
| 5,945,231 A | 8/1999 | Narayanan et al. ........... | 429/30 |
| 5,992,008 A | 11/1999 | Kindler ....................... | 29/730 |
| 6,015,610 A * | 1/2000 | Minor et al. ............. | 428/315.7 |

(Continued)

FOREIGN PATENT DOCUMENTS

EP    0 427 897 A1    5/1991

(Continued)

*Primary Examiner*—Gregg Cantelmo
(74) *Attorney, Agent, or Firm*—Mintz Levin Cohn Ferris Glovsky and Popeo P.C.

(57) ABSTRACT

The present invention provides a protonically conductive membrane for use in a direct methanol fuel cell wherein a portion of said protonically conductive membrane conducts protons from the anode face of the membrane to the cathode face of the protonically conductive membrane, and a portion of which evolves gas from the anode side of the membrane to the cathode side of the protonically conductive membrane where it is vented to the environment. The present invention also includes a membrane electrode assembly, fuel cell and fuel cell system which are comprised of the protonically conductive membrane and which evolve gas from the anode side of the protonically conductive membrane to the cathode side of the protonically conductive membrane, where it is vented to the ambient environment.

25 Claims, 5 Drawing Sheets

U.S. PATENT DOCUMENTS

| | | | |
|---|---|---|---|
| 6,130,175 A | 10/2000 | Rusch et al. | 442/77 |
| 6,355,149 B1 * | 3/2002 | Soczka-Guth et al. | 204/296 |
| 6,456,136 B1 * | 9/2002 | Sutherland et al. | 327/225 |
| 6,465,136 B1 * | 10/2002 | Fenton et al. | 429/309 |
| 6,492,044 B1 * | 12/2002 | Walsh | 429/13 |
| 6,541,159 B1 * | 4/2003 | Li et al. | 429/236 |
| 2002/0106549 A1 * | 8/2002 | Cooper et al. | 429/40 |

FOREIGN PATENT DOCUMENTS

| | | | |
|---|---|---|---|
| EP | 0577291 A1 * | 1/1994 | |
| JP | 06103983 A * | 4/1994 | |
| JP | 11086630 A * | 3/1999 | |
| JP | 2000-149965 | 5/2000 | |
| WO | WO 97/19480 A * | 5/1997 | |
| WO | WO 97 41168 | 11/1997 | |
| WO | WO 2003096445 A1 * | 11/2003 | |

\* cited by examiner

FUEL CELL MEMBRANE AND FUEL CELL SYSTEM WITH INTEGRATED GAS SEPARATION

This application claims benefit under 35 U.S.C. §119(e) of U.S. Provisional Application No. 60/250,592, filed Nov. 30, 2000, the entire disclose of which is herein incorporated by reference.

BACKGROUND OF THE INVENTION

1. Field of the Invention

The present invention provides a direct feed fuel cell for producing electrical energy by electrochemical oxidation/reduction of an organic fuel, and in particular to a direct feed methanol fuel cell with integrated gas separation.

2. The Prior Art

Fuel cell technologies are well known in the art and present opportunities for the commercial development of long-lasting power sources for portable power and electronics applications. With the trend toward greater portability of a wide array of consumer electronics, fuel cell technologies offer promising alternative power sources to meet the increased demand for portable power. Fuel cells can potentially replace or favorably compete with the various types of high density batteries presently used in consumer electronics, such as nickel metal-hydride and lithium ion battery systems, as well as relatively inexpensive alkaline batteries. These types of batteries are less than satisfactory power sources for such consumer electronics as laptop computers and cellular phones either due to their low power density, short cycle life, rechargability or cost. In addition, all these types of batteries present environmental safety concerns and costs for proper disposal.

Fuel cell systems are electricity-generating devices that convert energy produced from a simple electrochemical reaction involving a fuel reactant (methanol or hydrogen) and an oxidizing agent (air or oxygen) into useable electrical energy. "Direct" type of fuel cells, wherein the fuel reactant is directly fed into the fuel cell without prior modification or oxidation, are constructed of an anode electrode, a cathode electrode, and an electrolyte, such as an ion conducting membrane, that separates the electrodes. Fuel reactant is introduced into the fuel cell anode and a catalytic layer intimately in contact with the proton conducting membrane. The catalytic layer acts as an anode electrocatalyst that splits the fuel reactant into protons and electrons as a result of oxidation, releasing hydrogen ions from the reactant molecule. Protons generated at the anode selectively pass through the ion conducting membrane to the fuel cell cathode. A second catalytic layer intimately in contact with the ion conducting membrane acts as a cathode electrocatalyst that reduces hydrogen ions with oxygen molecules provided by circulating air or oxygen to form water. Electrons generated by anodic oxidation of fuel reactant molecules cannot pass through the ion conducting membrane and must flow around the membrane toward the cathode electrode. The flow of electrons is collected by current collection plates on outer sides of the fuel cell and directed into an electrical circuit thereby creating electricity.

Thus, the flow of protons (hydrogen ions) through the ion conducting membrane and the movement of electrons toward the cathode, generate electrical energy in the fuel cell. As long as constant supplies of fuel reactant and an oxidizing agent are maintained, the fuel cell can generate electrical energy continuously and maintain a specific power output. In addition, the fuel cell runs cleanly producing water and carbon dioxide as by-products of the oxidation/reduction of the fuel reactant. Hence, fuel cells can potentially run laptop computers and cellular phones for several days rather than several hours, while reducing or eliminating the hazards and disposal costs associated with high density and alkaline batteries. The challenge is to develop fuel cell technology and to engineer direct fuel cells to meet the form and operation requirements of small-scale or "micro" fuel cells for consumer electronics applications.

Direct fuel cells that demonstrate performance and reliability as potential power systems for portable electronics applications include direct methanol fuel cell (DMFC) systems that employ methanol as the fuel reactant and incorporate an ion conducting membrane electrolyte. Membrane electrolytes are non-liquid, non-corrosive electrolytes capability of operating at low temperatures, which makes such electrolytes commercially attractive for stationary and portable electronics applications. In addition, membrane electrolytes possess excellent electrochemical and mechanical stability, as well as high ionic conductivity that allow them to function as both an electrolyte and a separator.

Prior art direct methanol fuel cells, such as the fuel systems disclosed in U.S. Pat. Nos. 5,992,008, 5,945,231, 5,773,162, 5,599,638, 5,573,866 and 4,420,544, typically employ proton conducting, cation-exchange polymer membranes constructed of a perfluorocarbon sulfonic acid (PFSA) ionomer, such as NAFION® commercially available from E.I. duPont de Nemours and Co. Commercially available NAFION® membranes that act as membrane electrolytes for DMFC systems generally have a thickness of 25 to 175 μm. Composite membranes are also commercially available and can act as membrane electrolytes. Composite membranes are significantly thinner than homogeneous ionomeric membranes and generally have a thickness of 10 to 25 μm. Such composite membranes include, for instance, a polytetrafluorotheylene (PTFE) micromesh material with PFSA-filled pores available from W.L. Gore, Inc. of Newark, Del.

The membrane electrolytes are typically sandwiched between the anode and the cathode electrodes, which are comprised of catalytic layers in intimate contact with surfaces of the membrane electrolyte. The catalytic layers are electrocatalysts that catalyze the electrochemical oxidation/reduction of the fuel reactant, wherein an anode electrocatalyst disassociates hydrogen protons from the fuel reactant and a cathode electrocatalyst effects reduction of hydrogen ions with oxygen to form water. High surface area particles, such as platinum and ruthenium alloy particles, are commonly used as anode electrocatalysts, as disclosed in U.S. Pat. No. 5,523,177. Platinum/ruthenium (Pt/Ru) alloy particles are loaded in a predetermined ratio onto a gas diffusion layer in intimate contact with a surface of the membrane electrolyte to form an anode catalyst layer 42 that acts as the site of electrochemical oxidation. A common cathode electrocatalyst is platinum-black (Pt-black) which is similarly loaded onto a gas diffusion layer in intimate contact with an opposing surface of the membrane electrolyte to form anode catalyst layer 42 that acts as the site of electrochemical reduction. The electrochemical processes in a prior art DMFC system using a Pt/Ru anode electrocatalyst and a Pt-black cathode electrocatalyst are:

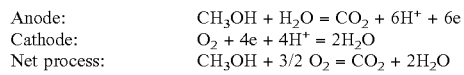

| Anode: | $CH_3OH + H_2O = CO_2 + 6H^+ + 6e$ |
|---|---|
| Cathode: | $O_2 + 4e + 4H^+ = 2H_2O$ |
| Net process: | $CH_3OH + 3/2\ O_2 = CO_2 + 2H_2O$ |

The electrocatalysts are typically bonded with or mounted to the gas diffusion layer. The gas diffusion layer is typically constructed of uncatalyzed porous carbon paper or carbon cloth that acts as a gas diffuser and separator. The gas diffusion layer of the anode electrode provides an effective water supply for anodic oxidation of methanol. The gas diffusion layer of the cathode electrode provides an effective supply of oxidizing agent, air or oxygen, while removing water or water vapor from the membrane electrolyte formed from electrochemical reduction of hydrogen ions. The by-products of the electrochemical processes are removed from the fuel cell by an anode vent, exhausting carbon dioxide from the anode electrode, and a cathode vent, removing water and exhausting air from the cathode electrode.

Current collector plates on outer sides of the fuel cell complete the fuel cell unit and conduct and collect electrons generated by the electrochemical oxidation of methanol. Current collector plates are typically constructed of carbon composites or metals, such as stainless steel and titanium, and should exhibit high electronic conductivity. Collector plates should also be impermeable to reactants. Current collector plates may be configured as bipolar plates or include flow fields having a range of flow channel geometries that provide effective supplies of reactant fuel and oxidizing agent, as well as effective removal of air, carbon dioxide and water from the respective electrodes.

DMFC systems are often multi-cell "stacks" comprising a number of single fuel cells joined to form a cell stack to obtain sufficient power densities to meet specific electrical power requirements. The feasibility of using DMFC systems as alternative power sources for portable electronics applications will depend upon the reduction in overall system size, while providing the necessary power densities for electrical power requirements. In addition, DMFC systems for consumer electronics applications will require development and design engineering that will enable methanol fuel cells to self-regulate and generate electrical power under benign operating conditions, including ambient air pressure without active humidification or cooling. Such operating conditions will require the reduction or elimination of auxiliary equipment and external moving parts typically associated with present DMFC systems, such as external fins for heat dissipation, fans for cooling and external flow pumps for supplying pressurized gas reactants and water for sufficient membrane humidification. In addition, peripheral mechanisms or systems, such as pumps and reservoirs used to store and supply methanol fuel and gas separators used to remove gases from liquid fuel cell effluents, will need to be reduced or eliminated in DMFC systems for portable power and consumer electronics applications.

At present, prior art DMFC systems typically operate in two basic configurations, a flow-through configuration and a recirculation configuration, as disclosed in U.S. Pat. Nos. 5,992,008, 5,945,231, 5,795,496, 5,773,162, 5,599,638, 5,573,866 and 4,420,544. The flow-through configuration directly feeds methanol as a vapor or an aqueous stream of either neat methanol or a solution of methanol and water into the anode electrode of the fuel cell. Anodic oxidation by-products, specifically carbon dioxide, as well as fuel impurities and small amounts of unused methanol are removed from the fuel cell through an anode vent. The flow-through configuration has the disadvantages of wasting unused methanol fuel and rendering the fuel supply susceptible to rapid and/or frequent changes in power demands placed on the fuel cell. In addition, the flow-through configuration presents problems with respect to handling the anode effluent discharged from the fuel cell. Peripheral mechanisms or systems are required with the flow-through configuration of DMFC systems to remove and dispose of the anode effluent discharged from the fuel cell. Such mechanism or systems would render flow-through DMFC systems impractical for use in portable electronics applications.

The recirculation configuration of DMFC systems, however, has the advantages of recirculating the anode effluent back into the anode electrode, which conserves unused methanol fuel and contains the anode effluent generated by the electrochemical oxidation/reduction processes at the cost of the power required to circulate the fuel mixture. Referring to FIG. 1, a prior art DMFC system that operates in a recirculation configuration generally includes an external fuel source 2 and a delivery mechanism 3 to supply the anode electrode 5 of the fuel cell 4 with methanol, typically as a methanol and water solution, and an external air source to supply the cathode electrode 6 with air, as an oxidizing agent. The anode effluent contains by-products of the anodic oxidation of methanol, including carbon dioxide and unreacted methanol, while the cathode effluent contains by-products of the cathodic reduction of hydrogen ions and oxygen, including water vapor and air. Gas separators 7, 8 incorporated in effluent return lines are used to remove gases from effluent fluids. The gas separator 7 incorporated in an anode effluent return line effectively separates carbon dioxide from the unused methanol solution and exhausts carbon dioxide from the DMFC system. Similarly, the gas separator 8 incorporated in the cathode effluent return line separates air from water vapor and exhausts carbon dioxide from the DMFC system, allowing water to be returned to the fuel delivery mechanism 3.

Prior art DMFC systems with recirculation configurations overcome the problems of handling anode effluent, conserving unused methanol fuel and rendering the fuel supply impervious to rapid changes in power demands of the fuel cell. Such features are highly advantageous for use of DMFC systems in portable power supplies and portable consumer electronics. However, recirculation configurations of prior art DMFC systems must incorporate auxiliary or external peripheral equipment in the recirculation loops, specifically gas separators, that render recirculating DMFC systems less feasible for portable power and electronics applications.

Therefore, it would be desirable to provide a recirculating direct feed methanol fuel cell system, wherein external gas separators are eliminated from the recirculation loops and by-product gases are removed from liquid streams within the fuel cell system.

SUMMARY OF THE INVENTION

The present invention provides a membrane for use in a direct methanol fuel cell with portions that are dedicated to conducting protons (but not electrons) generated as a result of the reactions that occur within the fuel cell, and other portions of which are dedicated to evolving anodically generated carbon dioxide through the membrane into the cathode chamber where it is vented to the ambient environment. Another aspect of this embodiment of the invention includes an application of a catalyst to one or both aspects of said membrane.

Another embodiment of the invention comprises a membrane electrode assembly (MEA) fabricated from a membrane of the first embodiment and which is sandwiched between two diffusion layers which assist in the distribution of reactants and byproducts to and from the membrane, and which includes current collection components disposed on the aspects of the gas diffusion layer opposite the membrane, and which allows anodically generated carbon dioxide to evolve through the membrane into the cathode chamber where it is vented to the ambient environment.

A third embodiment of the invention comprises a fuel cell comprised of a MEA fabricated using the MEA of the second embodiment, which is disposed in a housing, and which separates an anode chamber from the cathode chamber. Said anode chamber has a reactant inlet and an outlet through which unreacted fuel may be removed from the anode chamber. Said cathode chamber has an oxidant inlet and oxidant outlet, through which an oxidant, preferably ambient air, is introduced to the cathode face of the MEA.

A final embodiment of the invention comprises a fuel cell system comprised of a fuel cell described in the third embodiment, and which includes a means and apparatus for the introduction of fuel, the elimination of byproducts from the fuel cell system, the delivery of power to a load, and other functions for the control of the fuel cell system. Such system allowing anodically generated carbon dioxide to evolve through the membrane electrode assembly into the cathode chamber where it is vented to the ambient environment.

Accordingly, in one aspect of the present invention, a membrane electrolyte for a fuel cell includes a first material for conducting protons from a first side of said membrane to a second side of the membrane and a second material for conducting gas from the first side of the membrane to the second side of the membrane.

In another aspect of the present invention, a membrane for a fuel cell including a first material for conducting protons from a first side of the membrane to a second side of the membrane and a vent having a first end in communication with the first side of the membrane and a second end in communication with the second side of the membrane. The vent conducts a gas from the first side to the second side.

In yet another aspect of the present invention, a membrane electrode assembly for a fuel cell system includes a gas-evolving, protonically conductive membrane electrolyte having a first side exposed to an anode chamber of the fuel cell system and a second side exposed to a cathode chamber of the fuel cell system. The membrane includes a first material for conducting protons and a second material for evolving gas. The assembly also includes a first catalyst positioned proximate the first side of the membrane electrolyte, an anode gas diffusion layer positioned proximate the anode electrode, a second catalyst positioned adjacent the second side of the membrane electrolyte and a cathode gas diffusion layer positioned proximate the cathode electrode.

In yet another aspect of the present invention, a fuel cell includes a membrane electrolyte for a fuel cell including a first material for conducting protons from a first side of the membrane to a second side of the membrane and a second material for conducting gas from the first side of the membrane to the second side of the membrane, disposed within a housing.

In still yet another aspect, a fuel cell includes a housing and a membrane electrode assembly disposed within the housing forming an anode chamber and a cathode chamber. The membrane electrode assembly includes a gas-evolving, protonically conductive membrane electrolyte having a first side exposed to an anode chamber of the fuel cell system and a second side exposed to a cathode chamber of the fuel cell system, a first catalyst positioned proximate the first side of said membrane electrolyte, an anode gas diffusion material positioned proximate the anode electrode, a second catalyst positioned adjacent the second side of the membrane electrolyte, and a cathode gas diffusion material positioned proximate the cathode electrode.

In a further aspect of the present invention, a fuel cell system includes a fuel delivery device, a fuel source having carbonaceous fuel, the source in communication with the fuel delivery device, an anode chamber having an inlet for receiving a fuel mixture from the fuel delivery device and an outlet for returning unreacted fuel to the fuel delivery device, a cathode chamber having an inlet for allowing an oxidant to flow into the cathode chamber, a first outlet for exhausting gaseous effluent and a second outlet for directing water effluent to the fuel delivery device, a membrane electrolyte positioned between the anode chamber and the cathode chamber, the membrane comprising a first material for conducting protons from the anode chamber to the cathode chamber and a second material for conducting gas from the anode chamber to the cathode chamber.

In yet another aspect of the invention, a fuel cell system a fuel delivery device, a fuel source in communication with the fuel delivery device, an anode chamber having an inlet for receiving a fuel mixture from the fuel delivery, a cathode chamber having an inlet for allowing an oxidant to flow into the cathode chamber and an outlet for exhausting effluent out of the cathode chamber, a membrane electrolyte positioned between the anode chamber and the cathode chamber, the membrane comprising a first material for conducting protons from the anode chamber to the cathode chamber and a second material for conducting gas from the anode chamber to the cathode chamber.

BRIEF DESCRIPTION OF THE DRAWINGS

For a better understanding of the invention, reference is made to the drawings, which are incorporated herein by reference, and in which.

DETAILED DESCRIPTION OF THE PREFERRED EMBODIMENTS

Illustrative embodiments of the present invention described below provide a direct feed fuel cell system for producing electrical energy through an electrochemical oxidation/reduction of an organic fuel reactant and an oxidizing agent. More particularly, the invention is directed to a direct feed methanol fuel cell system for producing electrical energy through the electrochemical oxidation of an organic fuel, such as methanol, and reduction of an oxidizing agent, such as air.

The direct feed methanol fuel cell system may operate in a recirculating configuration and includes a proton-conducting membrane electrolyte that separates gas effluent from the fuel reactant. In one embodiment, the invention provides a , proton-conducting membrane electrolyte constructed as a composite of a proton-conducting material and gas separating material. Those skilled in the art will appreciate, however, that embodiments in accordance with the invention are not limited to a direct feed methanol fuel cell, but, rather, may also be used in other fuel cell systems that generate electrical energy from the electrochemical oxidation/reduction of organic fuel reactants and oxidizing agents. Those skilled in the art will also recognize that the inventions disclosed herein will also may be used in a variety of systems and architectures.

Embodiments of the invention will be described with reference to FIGS. 1–7 which are presented for the purpose of illustrating embodiments and are not intended to limit the scope of the claims.

Figure 2:
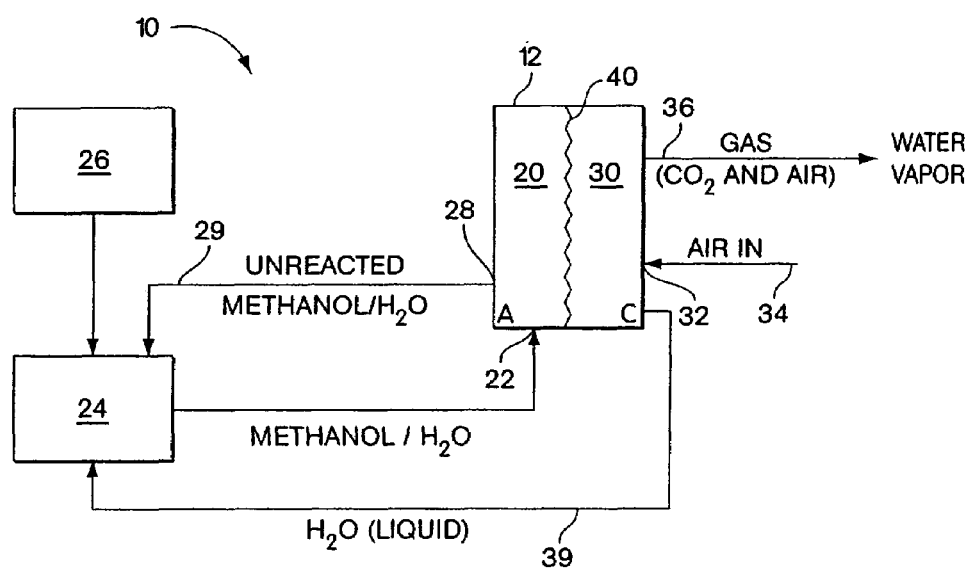
FIG. 2 is a schematic representation of a first embodiment of a direct feed methanol fuel cell system of the invention.

Referring to FIG. 2, a first embodiment of the invention provides a direct feed fuel cell system 10 for generating electrical energy from the electrochemical oxidation/reduction of an organic fuel reactant, such as a methanol and water solution, and an oxidizing agent, such as ambient air. The direct feed fuel cell system 10 includes a fuel cell outer housing 12 having an anode chamber 20, a cathode chamber 30 and a membrane electrode assembly 40 disposed between the anode and the cathode chambers 20, 30. The anode chamber 20 includes an anode inlet 22 to introduce the fuel reactant into the anode chamber 20. The anode inlet 22 is connected to a delivery mechanism 24 that delivers the fuel reactant to the anode inlet 22 from a fuel source 26. The anode chamber 20 may also include an anode effluent outlet 28 to remove unused or unoxidized fuel reactant from the anode chamber 20. The anode effluent outlet 28 returns the unoxidized fuel reactant to the delivery mechanism 24 by an anode effluent return line 29 for recirculation to the anode chamber 20. The membrane electrode assembly 40 evolves anodically generated carbon dioxide from the anode chamber 20 into the cathode chamber 30. The cathode chamber 30 includes a cathode effluent vent 36 to exhaust carbon dioxide and other by-products, such as air, water vapor and impurities, from the cathode chamber 30 to the atmosphere external to the fuel cell system 10. The cathode chamber 30 also includes a cathode inlet 32 to deliver the oxidizing agent to the cathode chamber 30 from an external source 34. A return feed line 39 may be connected to the cathode chamber 30 to transport water generated in the cathode chamber 30 and to return the water to the delivery mechanism 24 for recirculation with the fuel reactant to the anode chamber 20.

Figure 1:
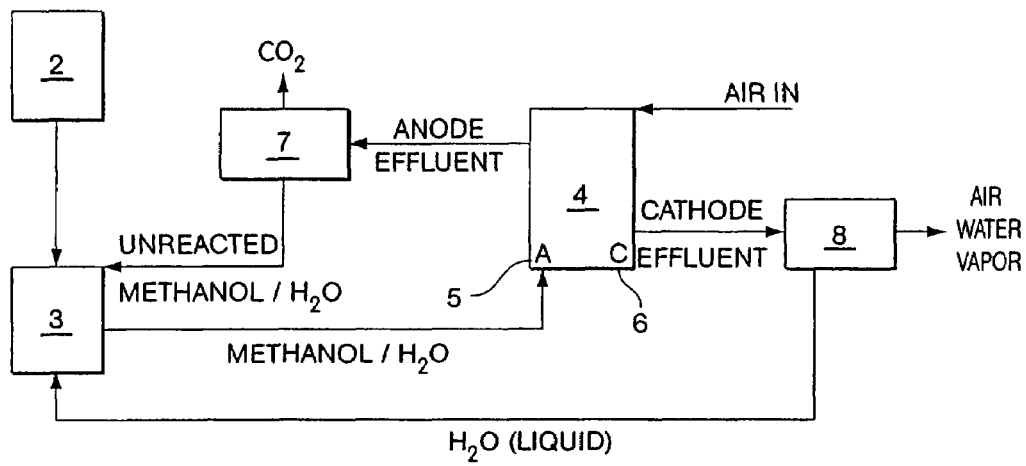
FIG. 1 is a schematic representation of a prior art direct feed methanol fuel cell system.

As FIG. 2 illustrates, the first embodiment of the fuel cell system 10 of the invention operates in a recirculation configuration, whereby the fuel reactant is conserved by a closed loop that delivers the fuel reactant to the anode chamber 20 and returns the unoxidized fuel reactant to the delivery mechanism 24 for recirculation to the anode chamber 20. Water generated by the fuel cell system 10 is conserved by a closed loop that removes water from the cathode chamber 30 and returns it to the delivery mechanism 24 for recirculation with the fuel reactant to the anode chamber 20. Carbon dioxide generated from oxidation of the fuel reactant is evolved by the membrane electrode assembly 40 to the cathode chamber 30 where it is exhausted via the cathode effluent vent 36. The need for an anode exhaust vent to remove carbon dioxide from the anode chamber 20, as used in prior art fuel cell systems illustrated in FIG. 1, is eliminated, thereby reducing the complexity of the direct feed fuel cell system 10 of the invention.

Figure 3:
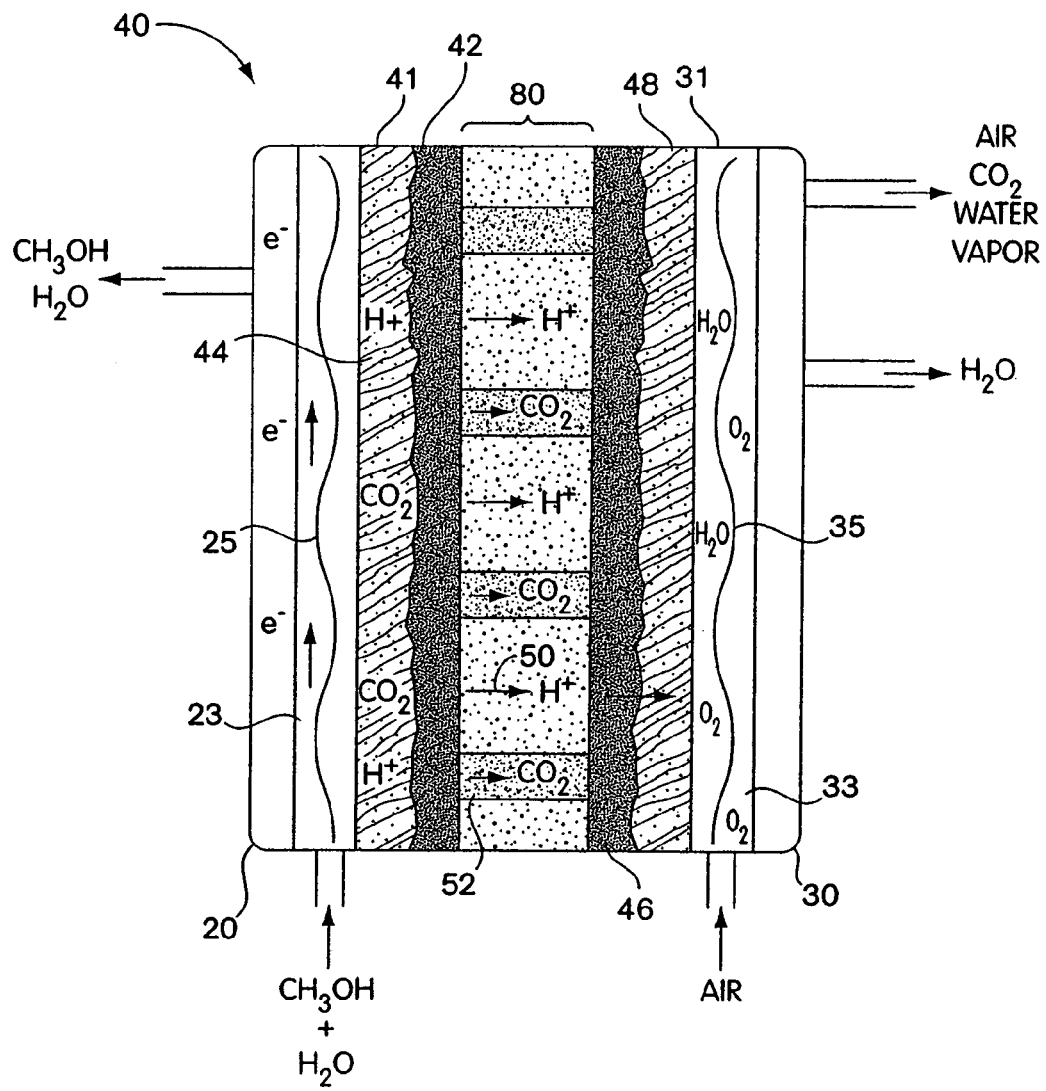
FIG. 3 is a cross-sectional schematic presentation of the electrochemical processes of an anode electrode, a cathode electrode and an ion conducting membrane electrolyte of the first embodiment.
Figure 4:
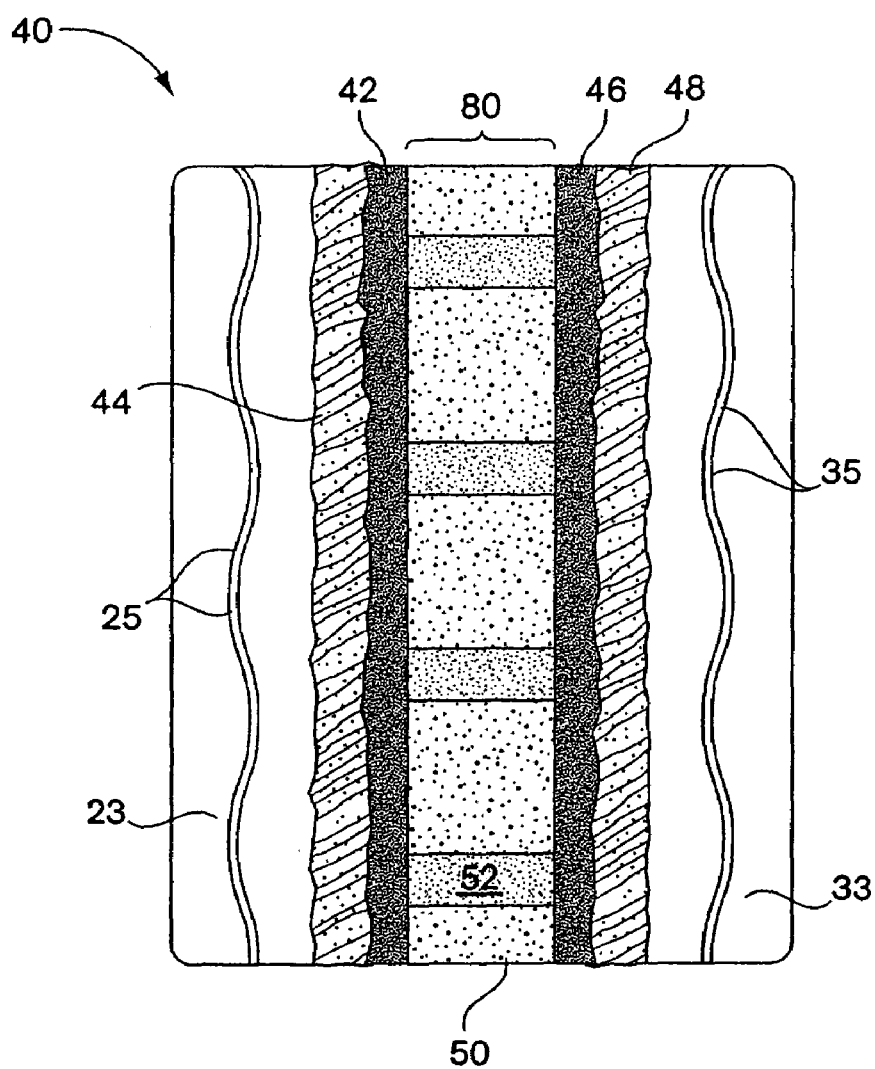
FIG. 4 is a cross-sectional perspective of the membrane electrolyte of the first embodiment with the anode and cathode electrodes.

Referring to FIGS. 3–4, the membrane electrode assembly 40 of the fuel cell system 10 is comprised of an anode gas diffusion layer 44, an anode catalyst layer 42, a gas-separating, proton-conducting membrane electrolyte 80, a cathode catalyst layer 46, and a cathode gas diffusion layer 48. The anode gas diffusion layer 44 and the anode catalyst layer 42 are in contact with the membrane electrolyte 80 on an anode side 41, and the cathode catalyst layer 46 and the cathode gas diffusion layer 48 are in contact with the membrane electrolyte 80 on a cathode side 31, such that the membrane electrolyte 80 is sandwiched between the anode catalyst layer 42 and the cathode catalyst layer 46, and the membrane electrolyte 80 and the catalyst layers 42, 46 are sandwiched between the anode and cathode gas diffusion layers 44, 48.

Referring to FIGS. 2 and 3, the fuel reactant used in the direct feed fuel cell system 10 of the first embodiment is an organic fuel such as a hydrocarbon fuel, including, although not limited to, methanol. Methanol may be supplied to the fuel cell system 10 as a vapor or a direct feed liquid stream of either neat methanol or a solution of methanol and water. Other hydrocarbon fuels may be used with the fuel cell system 10 of the invention, such as, although not limited to, ethanol, ethylene glycol, supplied to the fuel cell system 10 in either vapor or liquid state. The oxidizing agent used in the direct feed fuel cell system 10 of the first embodiment is preferably air supplied as either ambient or pressurized air. Other oxidizing agents may be used with the fuel cell system 10 of the invention, such as, although not limited to, oxygen or hydrogen peroxide. For illustrative purposes, the first embodiment will be described with reference to a direct feed liquid stream of a solution of methanol and water as the fuel reactant and ambient air as the oxidizing agent.

Methanol and water fuel solution is delivered to the membrane electrode assembly 40 from the fuel source 26, such as, although not limited to, a fuel reservoir, a fuel cartridge or other containing device that is either detachably connected to an outer surface of the fuel cell housing 12, or incorporated with the fuel cell system 10, or supplied from a source external to the fuel cell system 10. The methanol and water solution is delivered to the anode inlet 22 by the delivery mechanism 24, which includes, although is not limited to, a pump or siphoning device to supply the fuel reactant to the anode inlet 22. The methanol and water solution flows through the anode inlet 22 into the anode chamber 20, wherein the methanol and water solution is introduced into the anode chamber 20 and to the membrane electrode assembly 40. As shown in FIG. 3, the methanol and water solution is distributed throughout the anode chamber 20 by an anode conducting plate 23 having a flow field 25 with a specific geometry. The flow field geometry helps to provide an effective distribution of the methanol and water solution to the membrane electrode assembly 80 during operation of the direct fuel cell system 10. The flow field 25 geometry may include, although is not limited to, a plurality of flow channels arranged in a specific pattern or a single flow channel of a particular shape, such as a serpentine flow channel, as shown in FIG. 3. The flow field 25 geometry effectively extends throughout the anode conducting plate 23. The anode conducting plate 23 is constructed of an electrically conductive material, such as, although not limited to, a carbon composite, graphite or a number of metals, including, although not limited to, stainless steel. The geometry of the flow field 25 is achieved by machining the anode conducting plate 23 or forming the flow field 25 by a method well known in the art that is compatible with the material with which the anode conducting plate 23 is constructed.

The methanol and water solution is introduced to the anode side 41 of the membrane electrolyte 80. The anode catalyst layer 42 and the anode gas diffusion layer 44 are disposed on a first surface of the membrane electrolyte 80 of the anode side 41. The anode gas diffusion layer 44 helps to ensure the methanol and water solution is efficiently distributed past the membrane electrode assembly 40 during operation of the direct fuel cell system 10.

The anode gas diffusion layer 44 is constructed of a porous carbon fiber paper and/or carbon cloth that is well known in the art including, although not limited to, TORAY® paper or E-TEK® cloth available from E-Tek, Inc., Division of DeNora N.A., Inc. of Sommerset, N.J. Although dependent upon the material of construction, the anode gas diffusion layer 44 has a thickness generally in the range of about 150 μm to about 400 μm. The anode gas diffusion layer 44 may be additionally treated with additives well known in the art, which effectively increase diffusion or other properties of the anode gas diffusion layer 44, such as, although not limited to, TEFLON® for wet-proofing.

The anode catalyst layer 42 includes high surface area catalytic alloy particles, such as platinum particles (Pt) or a mixture of platinum and ruthenium alloy particles (Pt/Ru). The electrocatalytic particles are loaded onto either the anode gas diffusion layer 44 or the membrane electrolyte 80 to act as an electrocatalyst. The Pt/Ru alloy particles are well known in the art and provided either as "unsupported" particles in the form of a fine metal powder, or "supported" particles. The "supported" particles include electrocatalyst particles dispersed on high surface area particles, such as, although not limited to, Vulcan XC-72A available from Cabot Inc. of Boston, Mass. The anode catalyst layer 42 has a thickness generally in the range of about 5 μm to about 15 μm. The anode catalyst layer 42 may be alternatively constructed of other conductive/reactive high surface area particles or particle composites such as, although are not limited to, a Pt/Ru/Osnium combination. Such alternative materials of construction are suitable for reducing the level of platinum loading of the anode electrode, and, hence to reduce the cost of the anode electrode.

The anode catalyst layer 42 is loaded onto either the anode gas diffusion layer 44 or the first surface of the membrane electrolyte 80. The anode gas diffusion layer 44 may be thermally pressed to the first surface of the membrane electrolyte 80 to achieve sufficient contact for effective performance of the anode electrode 42. The anode catalyst layer 42 acts as an electrocatalyst and is the site at which the methanol and water solution undergoes electrochemical oxidation, wherein hydrogen ions are disassociated from methanol as follows:

$$CH_3OH + H_2O = CO_2 + 6H^+ + 6e.$$

The cathode catalyst layer 42 and the cathode gas diffusion layer 48 are disposed on a second surface of the membrane electrolyte 80 of the cathode side 31. The cathode catalyst layer 42 is applied to either the cathode gas diffusion layer 48 or the second surface of the membrane electrolyte 80. The cathode gas diffusion layer 48 may be thermally pressed to the second surface of the membrane electrolyte 80 to achieve sufficient contact for effective performance of the cathode catalyst layer 42. The gas diffusion layer electrode 48 helps to ensure that air is efficiently distributed past the membrane electrode assembly 40 during operation of the direct fuel cell system 10. In addition, the cathode gas diffusion layer 48 helps to effectively remove water and carbon dioxide from the cathode electrode when such by-products are generated from the electrochemical reduction of hydrogen ions and oxygen. The cathode gas diffusion layer 48 is similarly constructed of a porous material that is well known in the art including, although not limited to, carbon fiber paper, such as TORAY® paper, and/or carbon cloth, such as E-TEK® Cloth. The gas diffusion layer 48 has a thickness generally in the range of about 150 μm to about 400 μm, depending upon the materials of construction. The cathode gas diffusion layer 48 may be additionally treated with additives well known in the art, which effectively increase diffusion or other properties of the cathode gas diffusion layer 48.

The cathode catalyst layer 42 includes platinum alloy particles deposited on a surface of supporting carbon black and has a thickness generally in the range of about 5 μm to about 15 μm. The cathode electrode 46 acts as an electrocatalyst and is the site at which hydrogen ions and oxygen undergo electrochemical reduction, wherein hydrogen ions reduce with oxygen molecules as follows:

$$\tfrac{3}{2}O_2 + 6e + 6H^+ = 3H_2O.$$

Figure 5:
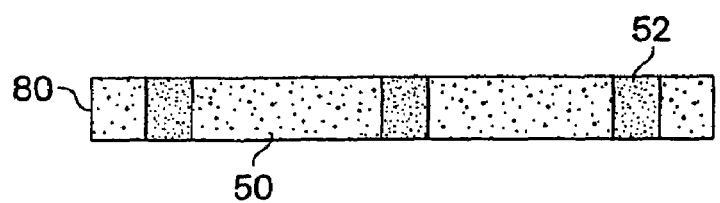
FIG. 5 is a cross-sectional side view of the membrane electrolyte of the first embodiment.

Referring to FIGS. 3–5, the gas-separating, proton-conducting membrane electrolyte 80 of the first embodiment is a composite of a first material 50 and a second material 52, wherein the second material 52 evolves anodically generate into a vent integrated with the membrane electrolyte 80. The first material 50 conducts protons (hydrogen ions), but not electrons, across the membrane electrolyte 80, while the second material 52 separates and conducts gases, such as carbon dioxide, through the membrane electrolyte 80. The first and second materials 50, 52 of the membrane electrolyte 80 selectively separate protons and carbon dioxide, respectively, from the methanol and water solution reacts within the anode chamber during operation of the direct feed fuel cell system 10.

Methanol is oxidized at the anode catalyst layer 42 as described above and disassociates into hydrogen ions and carbon dioxide. The proton conducting first material 50 of the membrane electrolyte 80 conducts hydrogen ions from the anode electrode to the cathode electrode. Hydrogen ions undergo reduction with oxygen at the cathode electrode to form water in the cathode chamber 30. The gas separating second material 52 effectively separates or removes the anodic carbon dioxide from the oxidizing methanol/water liquid stream as it passes over the anode electrode. Carbon dioxide is conducted through the gas separating second material 52 of the membrane electrolyte 80 into the cathode chamber 30. Carbon dioxide is subsequently exhausted from the cathode chamber 30 to the atmosphere external to the direct feed fuel cell system 10 by the cathode effluent vent 36. Transport of anodic carbon dioxide across the membrane electrolyte 80 and subsequent removal of anodic carbon dioxide from the direct feed fuel cell system 10 through the cathode effluent vent 36 eliminates the requirement for an anode effluent vent in the anode chamber 20 to exhaust carbon dioxide from the anode electrode.

Exhausting anodic carbon dioxide from the cathode chamber 30 through the cathode effluent vent 36 also eliminates the requirement for an external gas separator in the anode effluent return line 29 to remove carbon dioxide from the anode fluid effluent. By removing and conducting carbon dioxide from the oxidizing methanol and water solution to the cathode chamber 30 for exhaust, the composite membrane electrolyte 80 reduces the extent of external peripheral equipment or components of the direct feed fuel cell system 10 and, hence, reduces the complexity and cost of fabricating and operating the direct feed fuel cell system 10 system in a recirculation configuration. In addition, the composite membrane electrolyte 80 also allows the unoxidized methanol and water solution to be recovered from the anode effluent and recirculated to the anode chamber 20, thereby conserving fuel reactant while simplifying the overall recirculation configuration of the direct feed methanol fuel cell system 10.

The proton conducting first material 50 of the membrane electrolyte 80 of the first embodiment is constructed of, although not limited to, a hydrophilic polymer with a high affinity for water, a high proton conducting capacity and an excellent oxidation resistance. The proton conducting first material 50 also has an ability to transport hydrogen ions, while rejecting other undesired ions and molecules. The proton conducting first material 50 may include, although is not limited to, a perfluorosulfonic substituted polytetrafluorethylene, such as the ionomer NAFION®, commercially available from duPont. NAFION® is an attractive proton conducting polymer well known in the art and often used as a membrane electrolyte in direct feed methanol fuel cell systems. NAFION® has a high tolerance for the chemical environment of a methanol fuel cell, high mechanical strength and predictable dimensional changes. Other membrane electrolyte materials suitable for use with the direct feed fuel cell system 10 of the first embodiment include, although are not limited to, NAFION®-TEFLON®-phosphotungstic acid (NPTA) and NAFION®-zirconium hydrogen phosphate (NZHP).

The gas separating second material 52 of the membrane electrolyte 80 is constructed of, although not limited to, a hydrophobic polymer having a high capacity to evolve carbon dioxide from organic fuel reactants and high permeability to conduct carbon dioxide through the membrane electrolyte 80 to the cathode chamber 30. A hydrophobic polymer of the second material 52 may include, although is not limited to, ZITEX®, available from Norton Performance Plastics Corporation Wayne N.J.

Due to the high cost of fabricating the membrane electrolyte 80 with relatively expensive proton conducting polymers, such as NAFION®, other polymeric variants or materials may be used alone or in combination as the proton conducting first material 50 of the membrane electrolyte 80 in order to reduce high costs associated with high volume manufacture of membrane electrolytes. Alternative materials with which the proton conducting first material 50 may be constructed include, although are not limited to, polyvinylidine fluoride (PVDF).

Referring to FIGS. 4–5, the membrane electrolyte 80 is constructed as a composite in a configuration of at least a first portion of the proton conducting first material 50 and at least a second portion of the gas evolving second material 52, wherein the first and second portions are contiguous in the same plane to form a single layer infrastructure. As shown in FIGS. 4–5, in one version of the first embodiment, the composite membrane electrolyte 80 is formed from two or more portions of the first material 50 with two or more portions of the second material 52 disposed alternatingly between each of the portions of the first material in the same plane to form a single layer infrastructure. As shown in FIGS. 4–5, the second material 52 may be incorporated as stripes between adjacent portions of the first material 50, extending either an entire length or width of the membrane electrolyte 80, depending upon the overall shape and dimensions of the membrane electrolyte 80. The ratio of the overall dimensions of a first portion to the second portion in the composite membrane electrolyte will depend on the characteristics of the system and the fuel used.

Figure 6:
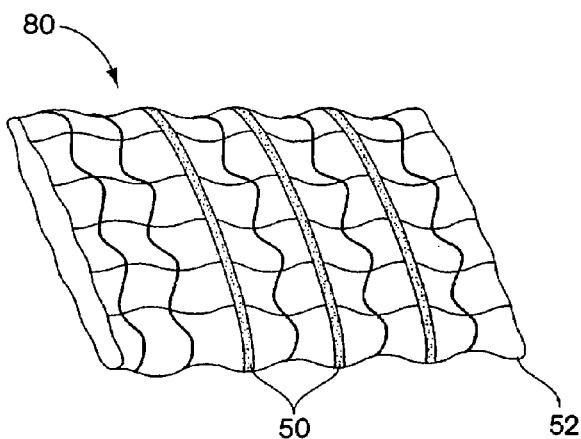
FIG. 6 is a perspective of another version of the membrane electrolyte of the first embodiment.

The first and second materials 50, 52 may be configured or oriented in different relationships to each other to form alternative configurations or infrastructures of the composite membrane electrolyte 80. Referring to FIG. 6, in another version of the first embodiment, the composite membrane electrolyte 80 may include the second material 52 forming a web or micromesh infrastructure of a gas separating, hydrophobic material, such as, for example, TEFLON®, within which strips or "stripes" of the proton conduct hydrophilic first material 50, such as, for example, NAFION®, are incorporated with or fabricated with the second material 52 to form the selectively conductive composite membrane electrolyte 80.

The membrane electrolyte 80 of the first embodiment is generally disposed in a central position within the fuel cell system 10, sandwiched between the anode electrode and the cathode electrode.

The overall dimensions of the membrane electrolyte 80 are dependent upon the application of the direct feed fuel cell system 10, manufacturing form factors, and the configuration of the direct feed fuel cell system 10. The surface area of the membrane electrolyte 80 (cell surface area) is generally in a range of about 10 $cm^2$ to about 100 $cm^2$, depending upon the power density (W/$cm^2$) required for specific power applications. Fuel cell surface area ($cm^2$) determines the current generated by the direct feed fuel cell system 10. The direct feed methanol fuel cell system 10 of the invention may be joined to one or more other direct feed fuel cell systems 10 to form a multi-cell system or stack to achieve the necessary power density to meet specific electrical energy requirements. For example, a single fuel cell system 10 with a total cell surface area of approximately 10 $cm^2$ may not provide sufficient power density for a specific electrical output. However, 3 to 5 single fuel cell systems 10, each with a total cell surface area of 10 $cm^2$, may be joined to form a multi-cell system with a total multi-cell surface area of 30 $cm^2$ to 50 $cm^2$ to effectively increase the overall power and voltage provided by the direct feed fuel cell system 10.

Figure 7:
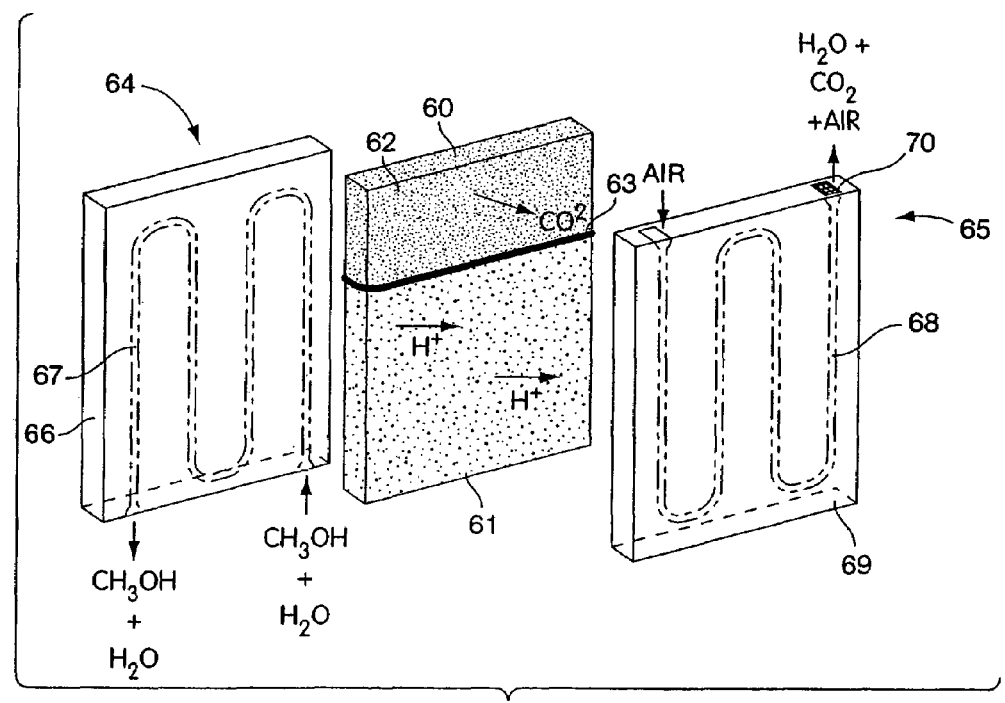
FIG. 7 is a perspective of a two-membrane electrolyte of a second embodiment of the invention.

Referring to FIG. 7, a second embodiment of the invention provides the direct feed fuel cell system 10 with a two-membrane ion conducting electrolyte 60 that includes a proton conducting membrane 61 constructed of a first material and a gas evolving membrane 62 constructed of a second material with a gasket 63 separating the first and the second membranes 61, 62. The first material of the proton conducting membrane 61 is, although not limited to, a hydrophilic polymer having properties to conduct protons (hydrogen ions) generated from a liquid stream of an oxidizing fuel reactant from an anode electrode 64 to a cathode electrode 65. The second material of the gas evolving membrane 62 is, although not limited to, a hydrophobic polymer having properties to separate carbon dioxide from the liquid stream of oxidizing fuel reactant, and to conduct carbon dioxide from the anode electrode 64 to the cathode electrode 65.

As shown in FIG. 7, during operation of the direct feed fuel cell system 10, the liquid fuel reactant, such as a methanol and water solution, passes through a flow field 67 of an anode conducting plate 66 and past the anode electrode 64. Protons, but not electrons, from the methanol and water solution are conducted. Protons conducted through the proton conducting membrane 61 to the cathode electrode 65. As the methanol and water solution circulates past the area of the anode electrode 64 that includes the gas evolving membrane 62, gaseous carbon dioxide is separated or removed from the oxidizing methanol and water solution by the gas evolving membrane 62. Carbon dioxide removed by the gas evolving membrane 62 is conducted from the anode electrode 64 to the cathode 65. Sufficient quantities of oxidizing agent such as ambient or pressurized air are introduced via the flow field 68 formed by cathode conductor. In addition, the flow field 68 provides a path for evolved carbon dioxide to exit from the area of the cathode electrode 65 that includes the gas evolving membrane 62, and removes water from the area of the cathode electrode 65 that includes the proton conducting membrane 61 formed by reduction of hydrogen ions with oxygen. Air, carbon dioxide, and water vapor are subsequently exhausted from the direct feed fuel cell system 10 by a cathode gas effluent vent 70. The geometry of the cathode chamber and/or flow fields may be such that the CO2 is vented into the exiting cathode flow.

Figure 8:
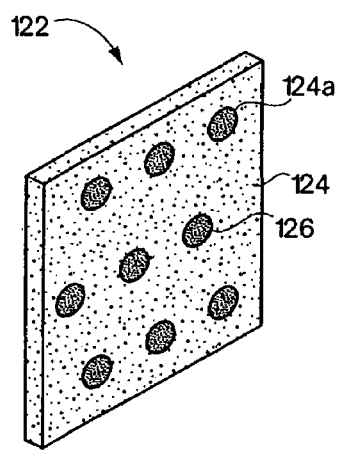
FIG. 8 is a perspective view of a membrane electrolyte according to a fourth embodiment of the present invention.
Figure 9A:
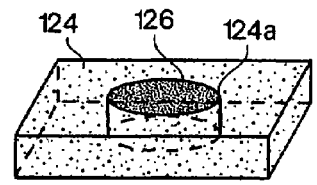
FIG. 9A is another perspective view of a membrane electrolyte according to the fourth embodiment of the present invention.
Figure 9B:
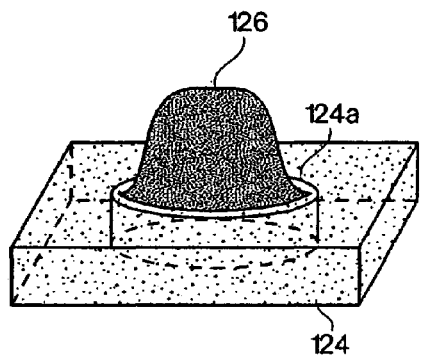
FIG. 9B is yet another perspective view of a membrane electrolyte according to the fourth embodiment of the present invention.
Figure 10:
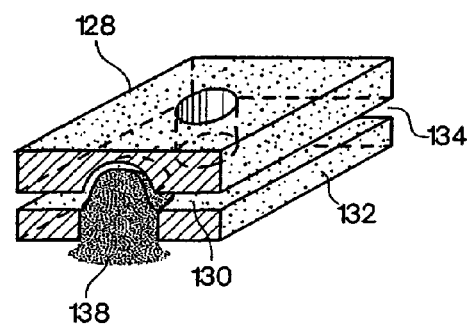
FIG. 10 is a perspective view of a membrane electrolyte and gas diffusion membrane according to a fifth embodiment of the present invention.

In yet another embodiment of the present invention, as shown in FIGS. 8–10, a gas-separating, proton-conducting membrane electrolyte 122 includes a first material 124 having a plurality of openings 124a for housing a second material 126. Together, the openings and second material form gas evolving portions. The second material 126 acts as a gas separator or gas vent integrated with the membrane electrolyte 122 to separate and conduct gases (such as $CO_2$) and the first material 124 has properties to conduct protons (hydrogen ions) across the membrane electrolyte 122. The first and second materials 124 and 126 of the membrane electrolyte 122 selectively separate protons and carbon dioxide, respectively, from the methanol and water solution as the liquid stream is introduced to the anode face of the membrane during operation of the direct feed fuel cell system.

A novel feature of this embodiment of the invention, is the ability to customize the rate and/or profile of evolving gases. Specifically, the number of openings 124a, as well as their size and shape, may be designed to evolve gases at varying rates and/or profiles. In addition, the design and operation of this embodiment avoids the coalescence and/or accumulation of CO2 bubbles in the anode chamber, which may limit the reactions and therefore the efficiency of the fuel cell.

The first and second materials may be manufactured via co-extrusion, or using other methods well known to those skilled in the art. Alternatively, the apertures may be punched out of the first material with a die, and the second material added using an appropriate adhesive, or mechanically fastened or otherwise attached.

Hydrostatic pressure on the anode face of the membrane electrolyte within the fuel chamber prevents $O_2$ from entering the anode chamber from the cathode chamber and encourages $CO_2$ to travel out via the cathode face of the membrane electrolyte. Alternatively, other designs and profiles may be used to limit the diffusion of reactants and by-products from the cathode chamber to the anode chamber via the membrane electrolyte. Each gas evolving portion may, regardless of the method used to manufacture, be designed to increase the ability to evolve $CO_2$ through the membrane electrolyte. Such designs include forming a gas evolution component with a dome or spike of second material, or by adding any additional, third dimensional component to the size and shape of the opening and/or second material.

As shown in FIG. 10, a gas diffusion layer 128 may be designed to correspond (be complimentary to) to the surface topography 130 of the membrane electrolyte 132. A gap 134 between the membrane electrolyte 136 and the gas diffusion layer 128 evolves CO2 to the gas evolving portions 138 of the membrane. In addition, the gas diffusion layer may include channels (not shown) positioned thereon or within which specifically direct the CO2 to the gas evolving portions. Such channels may be formed by embossing them onto the gas diffusion membrane, or using other methods known to those skilled in the art.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A membrane electrolyte for a fuel cell comprising a first material for conducting protons from an anode chamber of a fuel cell to a cathode chamber of the fuel cell and a second material organized and arranged with respect to the first material for conducting carbon dioxide gas from the anode chamber to the cathode chamber, wherein said second material comprises a web of micromesh, and wherein said first material comprises a plurality of strips positioned intermittently along said second material.

2. The membrane electrolyte according to claim 1, wherein said first material comprises a hydrophilic polymer having characteristics comprising an affinity for water, a proton conducting capacity, and oxidation resistance.

3. The membrane electrolyte according to claim 1, wherein said first material comprises perfluorosulfonic substituted polytetrafluorethylene.

4. The membrane electrolyte according to claim 1, wherein said first material comprises perfluorinated ionomer zirconium hydrogen phosphate.

5. The membrane electrolyte according to claim 1, wherein said first material comprises polyetheretherketone.

6. The membrane electrolyte according to claim 1, wherein said first material comprises polybenzimidazole.

7. The membrane electrolyte according to claim 1, wherein said first material comprises PVDF.

8. The membrane electrolyte according to claim 1, wherein said second material comprises expanded PTFE.

9. The membrane electrolyte according to claim 1; wherein said membrane is coated with a catalyst.

10. The membrane electrolyte according to claim 1; wherein said first material is coated with a catalysts.

11. The membrane electrolyte according to claim 1, wherein said first and said second materials are combined to substantially form a single layer structure.

12. A membrane electrode assembly for a fuel cell system comprising:
   a carbon dioxide gas-evolving, protonically conductive membrane electrolyte comprising a first material for conducting protons from an anode chamber of said fuel cell to a cathode chamber of said fuel cell and a second material organized and arranged with respect to the first material for evolving carbon dioxide gas from the anode chamber to the cathode chamber, wherein said second material comprises a web of micromesh, and wherein said first material comprises a plurality of strips positioned intermittently along said second material;

a first catalyst positioned proximate said first side of said membrane electrolyte;

an anode gas diffusion layer positioned proximate said anode electrode;

a second catalyst positioned adjacent said second side of said membrane electrolyte; and a cathode gas diffusion layer positioned proximate said cathode electrode.

13. The membrane electrode assembly according to claim 12, wherein said anode gas diffusion layer and/or said cathode gas diffusion layer comprises porous carbon.

14. The membrane electrode assembly according to claim 13, wherein said porous carbon comprises carbon fiber paper.

15. The membrane electrode assembly according to claim 13, wherein said porous carbon comprises a carbon cloth.

16. The membrane electrode assembly according to claim 12, wherein said anode gas diffusion layer and/or said cathode gas diffusion layer includes a thickness between approximately 150 μm to 400 μm.

17. The membrane electrode assembly according to claim 12, wherein said anode gas diffusion layer and/or said cathode gas diffusion layer is treated with an additive.

18. The membrane electrode assembly according to claim 17, wherein said additive comprises PTFE.

19. The membrane electrode assembly according to claim 12, wherein each of said anode gas diffusion layer and said cathode gas diffusion layer includes channels for directing gas to/from said second material of said membrane.

20. A fuel cell comprising a membrane electrolyte comprising a first material for conducting protons from an anode chamber of said fuel cell to a cathode chamber of said fuel cell and a second material organized and arranged with respect to the first material for conducting carbon dioxide gas from the anode chamber to the cathode chamber; wherein said second material comprises a web of micromesh, and wherein said first material comprises a plurality of strips positioned intermittently along said second material.

21. A fuel cell comprising a housing and a membrane electrode assembly disposed within said housing forming an anode chamber and a cathode chamber, said membrane electrode assembly comprising:

a carbon dioxide gas-evolving, protonically conductive membrane electrolyte having a first material for conducting protons from said anode chamber to said cathode chamber and a second material organized and arranged with respect to the first material for conducting carbon dioxide gas from the anode chamber to the cathode chamber; wherein said second material comprises a web of micromesh, and wherein said first material comprises a plurality of strips positioned intermittently along said second material;

a first catalyst positioned proximate said first side of said membrane electrolyte;

an anode gas diffusion material positioned proximate said anode electrode;

a second catalyst positioned adjacent said second side of said membrane electrolyte; and a cathode gas diffusion material positioned proximate said cathode electrode.

22. The fuel cell system according to claim 21, further comprising a fuel source provided internal to the fuel cell system.

23. The fuel cell system according to claim 21, further comprising a fuel source is external to the fuel cell system.

24. A fuel cell system comprising:

a fuel delivery device;

a fuel source having carbonaceous fuel, said source in communication with said fuel delivery device;

an anode chamber having an inlet for receiving a fuel mixture from said fuel delivery device and an outlet for returning unreacted fuel to said fuel delivery device;

a cathode chamber having an inlet for allowing an oxidant to flow into said cathode chamber, a first outlet for exhausting gaseous effluent and a second outlet for directing water effluent to said fuel delivery device;

a membrane electrolyte positioned between said anode chamber and said cathode chamber, said membrane comprising a first material for conducting protons from said anode chamber to said cathode chamber and a second material organized and arranged with respect to the first material for conducting carbon dioxide gas from said anode chamber to said cathode chamber; wherein said second material comprises a web of micromesh, and wherein said first material comprises a plurality of strips positioned intermittently along said second material.

25. A fuel cell system comprising:

a fuel delivery device;

a fuel source in communication with said fuel delivery device;

an anode chamber having an inlet for receiving a fuel mixture from said fuel delivery;

a cathode chamber having an inlet for allowing an oxidant to flow into said cathode chamber and an outlet for exhausting effluent out of said cathode chamber;

a membrane electrolyte positioned between said anode chamber and said cathode chamber, said membrane comprising a first material for conducting protons from said anode chamber to said cathode chamber and a second material organized and arranged with respect to said first material for conducting carbon dioxide gas from said anode chamber to said cathode chamber; wherein said second material comprises a web of micromesh, and wherein said first material comprises a plurality of strips positioned intermittently along said second material.

* * * * *